(12) United States Patent
Nagisetty et al.

(10) Patent No.: US 9,898,880 B2
(45) Date of Patent: Feb. 20, 2018

(54) AUTHENTICATION SYSTEM USING WEARABLE DEVICE

(71) Applicant: Intel Corporation, Santa Clara, CA (US)

(72) Inventors: Ramune Nagisetty, Protland, OR (US); Melissa A Cowan, Hillsboro, OR (US); Jason Martin, Beaverton, OR (US); Richard A Forand, Portland, OR (US); Wen-Ling M Huang, Los Altos, CA (US); Conor P Cahill, Waterford, VA (US)

(73) Assignee: Intel Corporation, Santa Clara, CA (US)

( * ) Notice: Subject to any disclaimer, the term of this patent is extended or adjusted under 35 U.S.C. 154(b) by 384 days.

(21) Appl. No.: 14/479,604

(22) Filed: Sep. 8, 2014

(65) Prior Publication Data

US 2015/0070134 A1 Mar. 12, 2015

Related U.S. Application Data

(60) Provisional application No. 61/875,775, filed on Sep. 10, 2013.

(51) Int. Cl.
*G07C 9/00* (2006.01)
*H04W 12/06* (2009.01)
*H04W 12/08* (2009.01)

(52) U.S. Cl.
CPC ...... *G07C 9/00119* (2013.01); *G07C 9/00111* (2013.01); *H04W 12/06* (2013.01); *H04W 12/08* (2013.01); *G07C 2009/00095* (2013.01)

(58) Field of Classification Search
CPC ........... G07C 9/00119; G07C 9/00111; G07C 2009/0095; H04W 12/06; H04W 12/08
See application file for complete search history.

(56) References Cited

U.S. PATENT DOCUMENTS

| 5,280,527 | A  | * | 1/1994 | Gullman ........... G06K 19/0718 713/184 |
|-----------|----|---|--------|------------------------------------------|
| 7,356,706 | B2 | * | 4/2008 | Scheurich ............... G06F 21/32 382/115 |
| 8,976,965 | B2 | * | 3/2015 | Aminzade ........... H04L 41/0816 380/258 |
| 2009/0309605 | A1 | * | 12/2009 | Prance ............... G01R 19/0023 324/457 |

* cited by examiner

*Primary Examiner* — Brian Zimmerman
*Assistant Examiner* — Sara Samson
(74) *Attorney, Agent, or Firm* — Schwabe, Williamson & Wyatt, P.C.

(57) ABSTRACT

A wearable device ("WD") stores a token after its wearer completes a successful strong authentication on a primary protected device ("primary PD"). Other protected devices ("secondary PDs") recognize the stored token as representing a strong authentication and grant the user access while the user continues to wear the WD within a "digital leash-length" proximity. The WD constantly monitors whether the user continues to wear the device. Upon sensing that the user has removed the WD, the WD deletes, disables, or invalidates the token, The user must then repeat the strong authentication to gain further access to the protected devices.

17 Claims, 6 Drawing Sheets

AUTHENTICATION SYSTEM USING WEARABLE DEVICE

CROSS-REFERENCE TO RELATED APPLICATIONS

This application claims priority from U.S. Prov. Pat. App. No. 61/875,775 filed 10 Sep. 2013, which is entirely incorporated by reference herein.

FIELD

The following relates to wireless authentication using wearable devices.

BRIEF DESCRIPTION OF THE DRAWINGS

The following description and accompanying drawings are used to illustrate some example embodiments. In the drawings.

DETAILED DESCRIPTION

Figure 1:
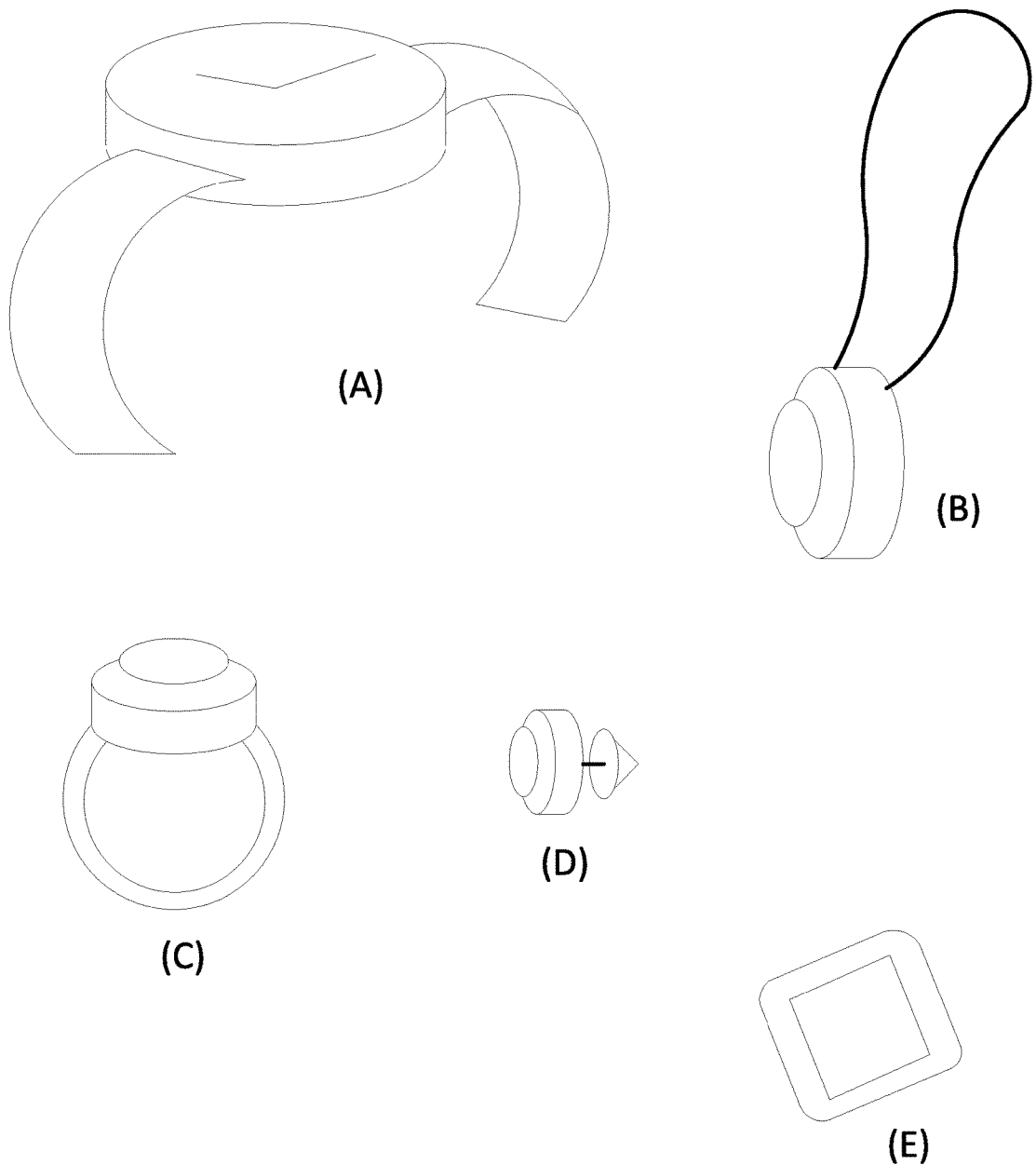
FIG. 1 illustrates some examples of form factors of embodiments of wearable devices.

The following description may include numerous specific system details such as logic implementations, means to specify operands, resource partitioning/sharing/duplication implementations, types and interrelationships of system components, and logic partitioning/integration choices. These details are included in the examples to enhance understanding of the described embodiments. Those skilled in the art will apprehend, however, that some embodiments may be practiced without the included specific system details, or with their equivalents. Other details, such as control structures, gate level circuits and full software instruction sequences, may be omitted or only generally described to avoid obscuring the embodiments. The included descriptions is expected to enable those of ordinary skill in the art to implement appropriate functionality without undue experimentation.

References to "one embodiment," "an embodiment," "an example embodiment," "some embodiments," etc., may indicate that the embodiment described includes a particular feature, structure, or characteristic; however, other embodiments possible within the scope of the claims may not necessarily include the feature, structure, or characteristic. Successive uses of such phrases do not necessarily all refer to the same embodiment(s). When a particular feature, structure, or characteristic is described in connection with a particular embodiment, the scope of the claims may also encompass the use of such feature, structure, or characteristic in connection with other embodiments, whether or not explicitly described.

The following description and claims may use the terms "coupled," "connected," "paired," or "linked," along with their derivatives. These terms are not intended to be interchangeable. "Coupled" indicates that two or more elements, which may or may not be in direct physical or electrical contact with each other, co-operate or interact with each other. "Connected" indicates that coupled elements have established communication with each other. "Paired" indicates that particular coupled or connected elements are configured to automatically accept communications from each other upon re-coupling or re-connection following a decoupling or disconnection. "Linked" indicates that least one element monitors the status of another to which it is coupled or connected; in many cases, the monitoring is mutual between two or more linked elements.

Embodiments may also be provided as a software product including instructions for programming a computer (or other electronic device) to perform a process, where the instructions are stored on a non-transitory machine-readable medium. The non-transitory machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. Embodiments may also be provided as a downloadable software product, wherein the program may be transferred from a remote computer (e.g., a server) to a requesting computer (e.g., a client) by data signals embodied in a carrier wave or other propagation medium via a communication link (e.g., a modem or network connection).

Many organizations limit access to certain devices (e.g., computers, phones, automated tools, vehicles) or areas (e.g., labs, archives, cleanrooms, cabinets). In high-security environments, locks and other access control devices may require users to present "strong" (multi-factor) authentication of their identities as authorized users. Biometric factors may be used for authentication besides, or instead of, passwords or pass-gestures. A limited-access device, whether it contains sensitive data or locks an entry to a sensitive space, may be variously referred to as a restricted device, a first device, an authenticating device, a client device, or simply a "device." For the purposes of this Description each one will be generically referred to as a "protected device" ("PD").

Some embodiments of a wireless authentication system and process for users requesting access to a PD involve an interaction between the PD and a second, wearable device worn by a prospective user. The second device may be referred to as a second device, a wearable device, a wearable companion device; or simply a "device." For the purposes of this description it will be referred to as a "wearable device" ("WD").

At least the first time the PD and WD interact, the user wearing the WD is authenticated by multiple factors. The user authentication processes may take place on the WD, the PD, or both. The PD also verifies that the WD is a genuine, approved component of the authentication system in good working order. Thereafter, the WD periodically or continuously monitors whether the authenticated user is continuing to wear the WD and, on a negative result, notifies the PD. Concurrently, the distance between the PD and the WD is periodically or continuously sensed and compared to a threshold proximity, or maximum attendance distance, hereinafter called the "digital leash-length" ("DL-L"). As long as the system continues to confirm that the authenticated user is continuing to wear the WD within the DL-L of the PD, the PD continues to allow the user access. If either of those conditions ceases to be true, the PD locks itself, denying further access until the user is re-authenticated or a different authorized user is authenticated. Some embodiments of the system also log the user out and block further access in response to other triggers such as a failure of the WD's power source or withdrawal of permission from a human or automated system administrator. Optionally, the system may reset itself at suitable intervals (e.g., every 24 hours, every week, or every month) and require that all users re-authenticate after the reset.

In some embodiments, after an initial authentication between the WD and one PD (the "primary PD"), the user may also be allowed access to other protected devices ("secondary PDs") without a further multi-factor authentication, provided that the WD confirms that it is still being worn by the authenticated user. In this scenario, the secondary PDs need not necessarily be capable of biometric or other multi-factor authentication; they only need to sense the presence or absence of a WD state corresponding to "still worn by a currently authenticated user" and whether the WD is positioned within the DL-L of the secondary PD.

In some embodiments, the multiple authenticating factors may include passwords, pass-gestures, pen-pad signatures, or biometric factors such as fingerprints, palm print, palm vein, iris or other ocular scan, facial or voice recognition, or any other bodily feature that varies sufficiently from one person to another). The user may use several PDs and may be authenticated to each of them by the same WD. Optionally, the authentication process may include contingencies for situations when two or more users' WDs are within the DL-L of the PD, or conversely when two or more PDs are within the DL-L of the same WD but the user is only actively using one of the PDs.

In some embodiments, the WD may receive a credential representing the user's strong authentication from a primary PD, store the credential, and securely transmit the credential to a primary or secondary PD on demand. The WD may optionally securely link to, or be otherwise recognized by, multiple PDs simultaneously. In some embodiments, the WD may have the ability to detect when the user removes it (e.g., a sensor on the WD may detect loss of contact with skin, for instance by sensing capacitance); when the WD senses that the user has removed it, it may erase, discard or otherwise disable the stored credential to prevent unauthorized use by another. If the user later puts the WD back on, re-authentication of the user's identity may be required to retrieve the stored credential or create a new valid credential. In some embodiments, the WD may provide a distance-sensitive presence indicator to enable a PD to recognize when the WD is positioned within the DL-L.

In some embodiments, the WD may include additional sensors or sensing functions to provide supplementary or primary authentication and presence factors as part of the initial strong authentication and/or as the ongoing detection of the user's continued wearing of the WD (e.g., the WD may monitor the user's EKG to verify that the same user is still wearing the WD.

In some embodiments, the resulting strong authentication (biometric-based or otherwise) may be stored as a token in the WD. The WD may further include a "dead-man switch" to be triggered when the WD loses "approximate contact" with the user's body. One common example of a dead-man switch opens when a user stops holding it closed (e.g., if the operator dies). Some embodiments of this dead-man switch may be described by a broader definition: They open (or otherwise change state) upon losing approximate contact with the user's body, but the user may not be required to affirmatively apply any force to maintain approximate contact.

"Approximate contact" may mean direct contact with the skin, or separation from the skin by a small air gap on the order of a few centimeters or less (as with a pendant WD that may swing a small distance away from the skin when the user leans forward), or contact with a clothing material or accessory through which some index of a nearby human presence (e.g., breath, a heartbeat, a thermal or electromagnetic signature) can be sensed by the sensors in the WD. The dead-man switch, when triggered by the sensors' failure to detect the user's continued presence, may activate logic that removes or otherwise disables the stored token, so that no unauthorized person may use the WD to access one or more PDs. To resume authorized use of the WD, the authorized user performs a strong re-authentication process after putting the WD back on.

In some embodiments, the dead-man switch may not be immediately triggered at the instant the sensors fail to detect continued contact with the user. The logic may include a built-in delay between the sensors' failure to detect user contact and the activation of the dead-man switch. If the sensors resume sensing a user presence during the delay, the dead-man switch is not activated. This prevents the dead-man switch from being unnecessarily activated when the sensors lose contact with the user presence for a very short time; for example, if the WD swings, bounces, or twists when the user walks or changes position. Optionally, the delay time may be less than the time it would take for the user to remove the WD and for someone else to put on the user's WD. "Approximate contact" also includes this type of intermittent contact, with loss of contact lasting less than a threshold duration (e.g., on the order of seconds or less).

The continued presence of a valid token on the WD confirms that the dead-man switch has not been activated and the WD is still attached to the user who performed the initial strong authentication. Detection of the token may thus replace repeated strong authentications on secondary PDs accessed by the user after the initial strong authentication. Therefore, the secondary PDs need not be equipped to perform strong authentication themselves; only the primary PD requires that ability. For example, the primary PD may be an office computer equipped to read palm veins. A user authenticated by the primary PD may subsequently access another PD, such as a phone, that is distant from the primary PD (and possibly connected to a different network) without another palm-vein authentication, provided that (1) the other PD recognizes a valid token on the WD, and (2) the user has continuously worn the WD since the initial strong authentication so that the token remains on the WD. In some embodiments, the token may include biometric information captured during the strong authentication. Token recognition may augment, or even replace, passwords, personal identification numbers, and the like on the secondary PDs. Note that some of the secondary PDs may be equipped to operate as primary PDs (e.g., collecting biometric data), but in some embodiments of this system those devices may bypass their default strong-authentication process if they detect a valid WD token.

A PD in use by the user monitors the token (or other detectable "authenticated state") of the WD, either continuously or periodically with a period of seconds or less. In some embodiments, if the PD fails to find the token or other detectable authenticated state of the WD, the user has probably moved away beyond the PD's digital leash length, or taken off the WD thus activating the dead-man switch.

Logic in the PD reacts by logging out the user (optionally after saving data and settings), locking the PD, disconnecting the PD from the network, powering down the PD, or otherwise ceasing to grant access.

In some embodiments, one or more first devices (primary PDs) configured for at least one type of strong authentication provides initial authentication of all authorized users of primary or secondary PDs, by biometric or other means. This may be repeated after periodic (e.g., daily or weekly) system resets. A primary PD may be a computer, a laptop, a phone, a set-top box, a smart appliance, or any other type of device that would have at least one type of biometric reading mechanism.

In some embodiments, a second, wearable device (WD) is worn by the user in some manner. While the user wears the WD, the strong authentication can be performed at the primary PD and the primary PD can then send a secure token or key, representing the successful strong authentication of an authorized user, to the WD. The WD, after receiving the token or key from the primary PD, may begin monitoring the continued presence of the user. At approximately the same time, or alternatively at a selected later time, the primary PD transmits a copy of the token over the network to other PDs (or to a data-store accessible to the other PDs). The user wearing the WD may then automatically be authenticated into the other PDs, including computing platforms of all types and services, that detect the token on the WD within a threshold proximity (the DL-L, compare it to each copy in the list of token copies transmitted by primary PD(s), and find a match that verifies the token's validity. The DL-L may be set by a threshold signal strength of a short-range wireless signal such as Bluetooth Low Energy (BLE), Near Field Communication (NFC), or another type of proximity-based wireless technology. The WD token, or other wireless authentication functionality, may be disabled when (1) it is removed from the user's body, (2) if the battery or other power source is depleted, or (3) a scheduled reset of the authentication system occurs.

FIG. 1 illustrates some embodiments of wearable form factors of devices that may be implemented as the WD. In some embodiments, the WD that stores the strong authentication token may be a watch (A), a pendant (B), a ring (C), an earring (D), an adhesive skin patch (E), or any other type of WD capable of maintaining contact or approximate contact with the user's body.

Figure 2:
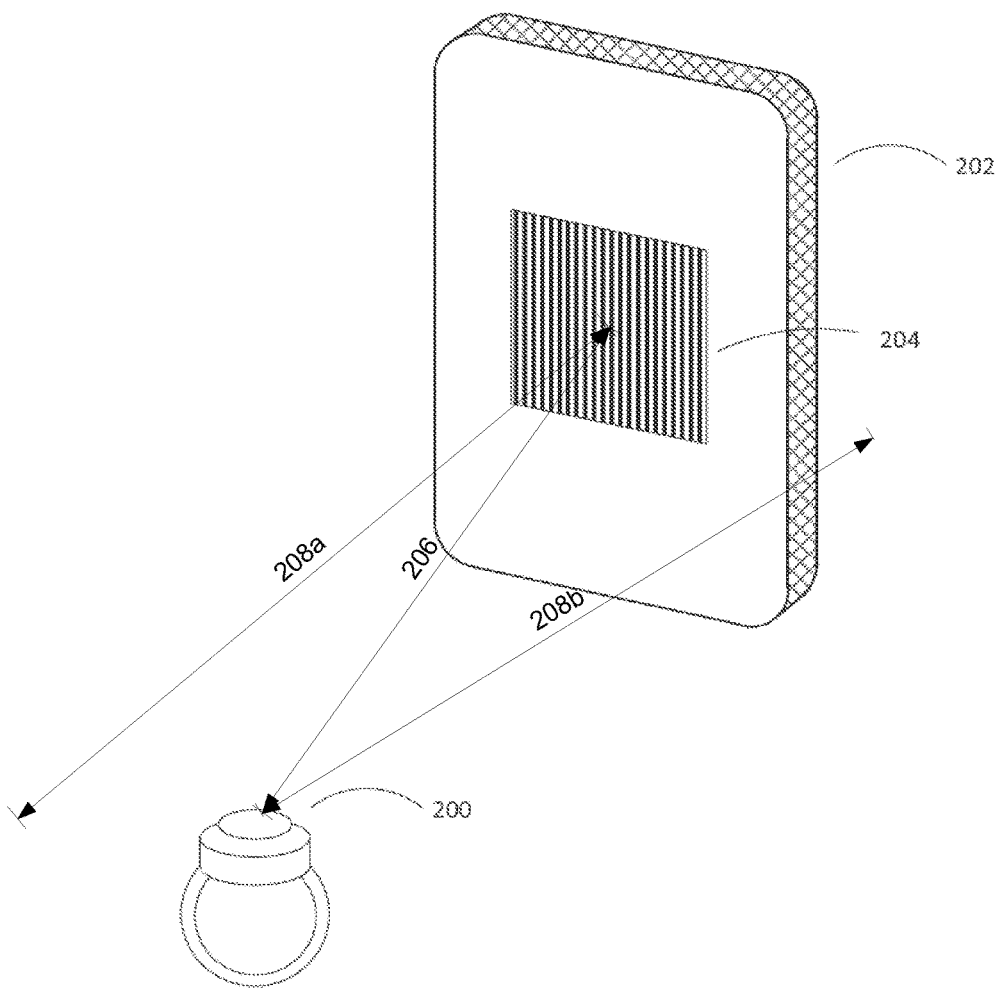
FIG. 2 illustrates an embodiment of a wearable device and a protected device in proximity with each other, allowing the strong authentication to take place.

FIG. 2 illustrates a WD positioned within the DL-L of a primary PD for initial strong authentication. WD 200, in this case a ring, and primary PD 202, in this case a smartphone with a palm vein reader 204, are separated by a distance 206 which is less than the DL-L 208a (a DL-L set by primary PD 202) and/or DL-L 208b (a DL-L set by WD 200). The DL-L for a PD and WD may be determined by settings or characteristics on the PD, on the WD, or both. With distance 206 less than DL-L 208a and/or 208b, primary PD 202 and/or WD 200 may perform a strong authentication of a user wearing WD 200, provided both devices 202 and 204 have sufficient operating power. Palm vein reader 204 may perform a biometric component of the strong authentication. Either PD 202 or WD 200 may provide one or more additional authentication factors (e.g., password, pass-gesture, or another biometric factor such as facial or voice recognition). If the process results in successful authentication, PD 202 may provide a token (or other detectable state-change), representing the successful strong authentication of an authorized user, to the WD 200. The WD stores the token in a manner enabling detection by other PDs. From then until the user removes or otherwise de-authenticates WD 200, the user can be authenticated on one or more PDs (either returning to primary PD 202 or approaching other PDs that may or may not have strong authentication capabilities) simply by moving within the DL-L of the PD and allowing the PD to read the token on the WD.

Figure 3A:
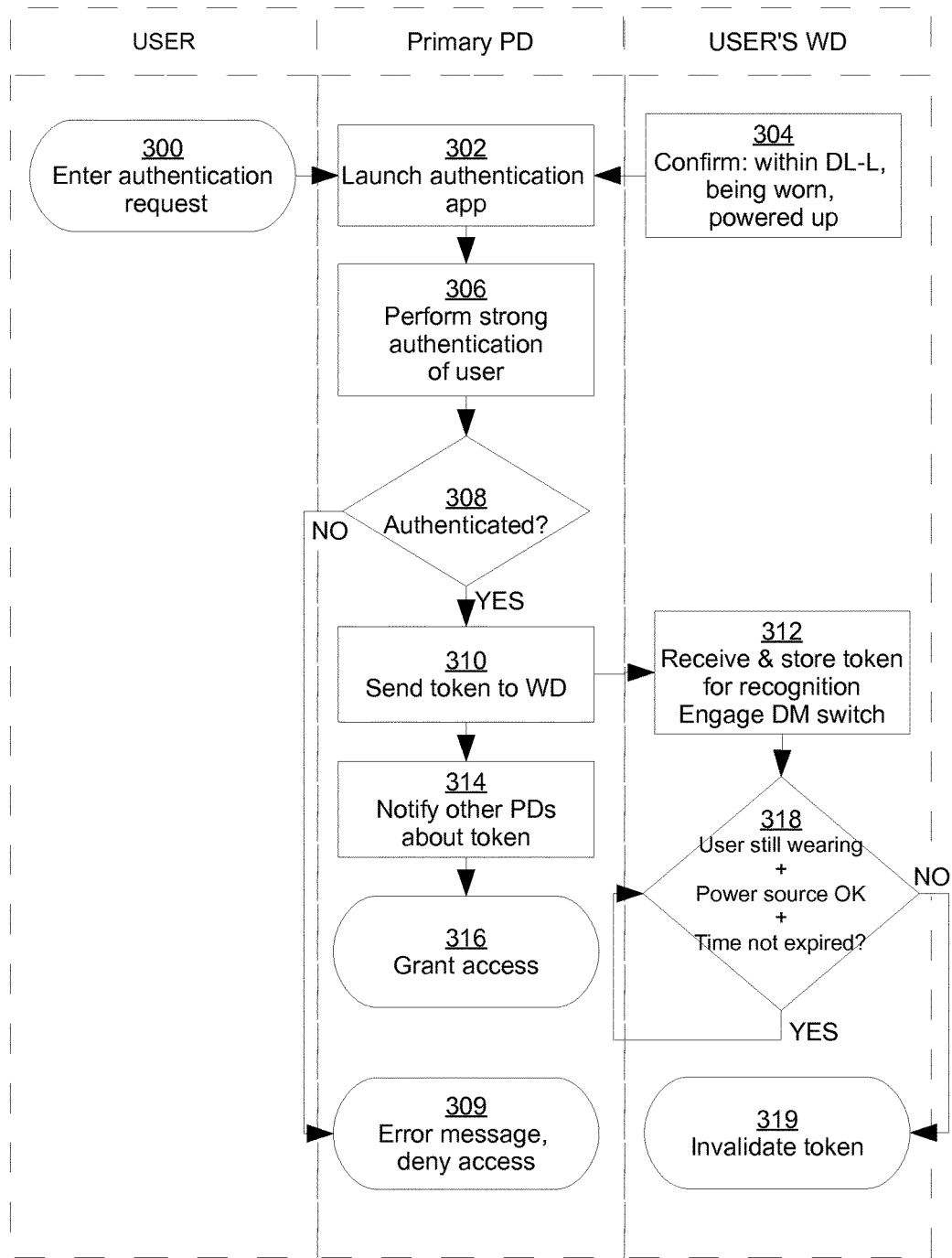
FIGS. 3A and 3B are flowcharts of example processes for user authentication and subsequent access and use in a protected-device/wearable device system.
Figure 3B:
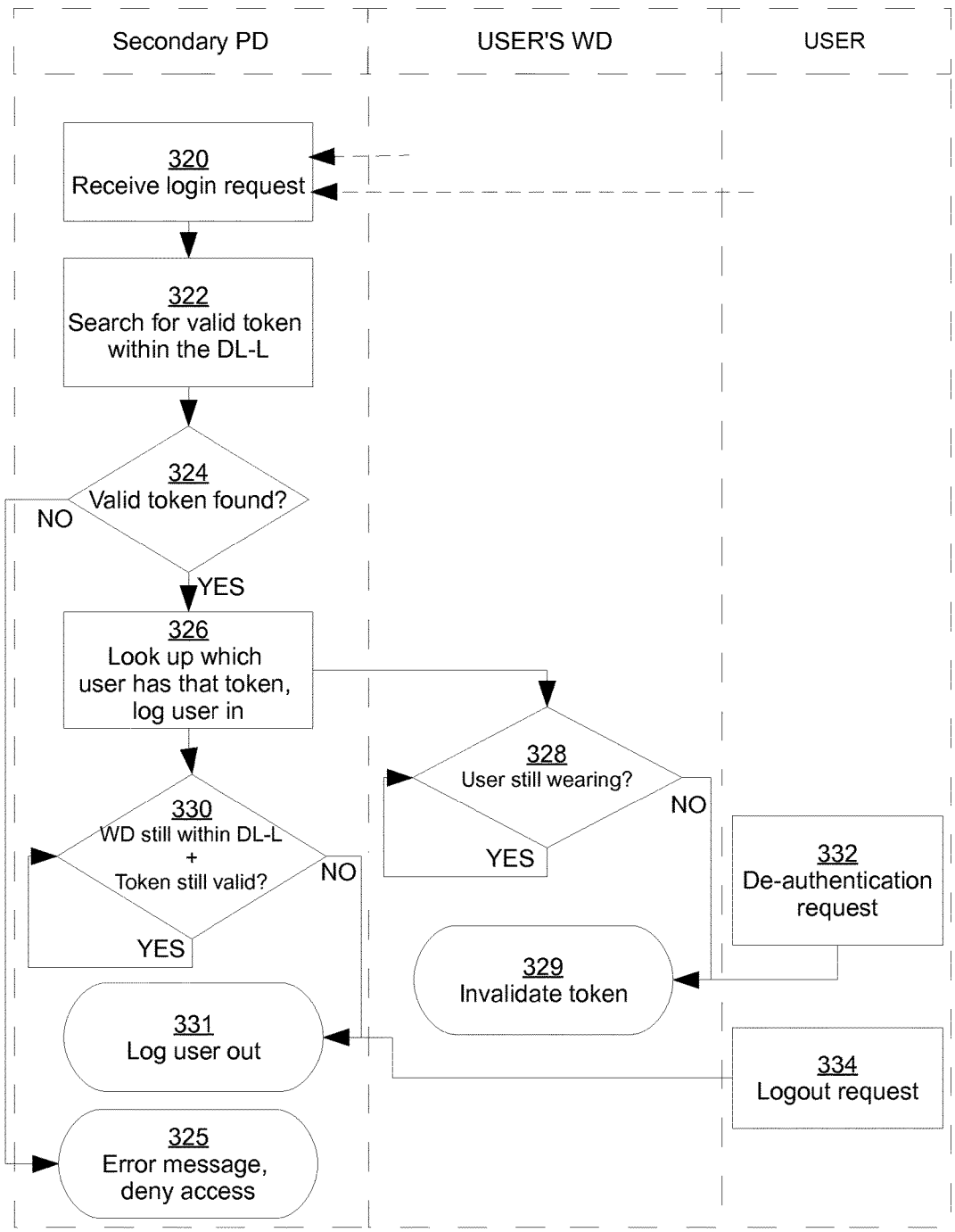

FIGS. 3A and 3B are flowcharts of example processes for user authentication and subsequent access and use in a PD/WD system. Each of the processes on the PD and WD is performed by processing logic that may include software, hardware, firmware, or a combination thereof.

FIG. 3A is a "swim-lane" flowchart showing actions of the user, PD, and WD in an embodiment of a process for strong authentication on a PD. A prospective user wearing a sufficiently powered WD approaches within the DL-L of the primary PD and requests authentication (e.g., by a gesture, a tap, a selection of the app in the user interface, or other type of application launching procedure; step 300). In response, the primary PD's process logic launches an authentication application ("app," step 302). Optionally, the authentication app may search for a WD within the PD's DL-L that is powered up and in a state (e.g., sending or responding to a signal) signifying that the WD is currently being worn by a user (step 304) before proceeding.

The processing logic evaluates multiple authentication factors of the user during a strong authentication process (step 306) that may include one or more biometric factors as described above. If the authentication succeeds (step 308), the PD sends a token to, or triggers some other detectable state-change of, the WD (step 310). If not, the PD denies access, optionally with an error message (step 309). In some embodiments, the user may wear two or more WDs that redundantly receive the token. Next, processing logic in the WD accepts the token and engages the dead-man switch (step 312). In some embodiments, the PD may transmit a copy of the token to other PDs on the same network, or to a storage device accessible by the other PDs. In some embodiments, the PD may make the copy of the token accessible to only a subset of the PDs on the network, if the authenticated user only has permission to access the subset. Such subsets may be stored on a network server or shared drive and modified by administrators as needed.

At this point, the token is recognizable as valid by the other PDs that have been given access to the copy transmitted by the primary PD. The token may subsequently be deleted, disabled or otherwise rendered invalid (step 319) under one of several circumstances (step 318). For example, if the user removes the WD, the dead-man switch triggers invalidation. In another example, the token may have a finite time of validity (e.g., 24 hours) and will become invalid when the time expires. Loss of power to the WD will also trigger invalidation. Some embodiments of WDs may include a low-power warning (e.g., visible, audible, or haptic such as vibration).

Finally, the authentication app sends information about the token to other PDs in the system (step 314). Thereafter, any PD in the system that the user is permitted to access will recognize the token and authenticate the user when the user approaches within the DL-L (and, optionally, requests access).

FIG. 3B is a flow diagram of an embodiment of a process for interaction between an authenticated user, his or her WD, and a secondary PD. A "secondary PD" is any PD to which the user requests access while wearing a WD with a valid token. For example, if the user logs out of the primary PD that provides the strong authentication and logs back in later with the still-valid token, the former "primary PD" may function as a "secondary PD" and accept the token alone for authentication.

The process begins with a login request to the secondary PD (step 320). The login request may include the user actively interacting with the secondary PD (e.g., striking a keyboard key or touching a touchscreen), the user actively causing the WD to send a signal to the secondary PD (pressing a "Login" button or the like), or it may be one of the WD or the secondary PD detecting that the other device is within the DL-L. In any of these cases, the secondary PD senses that a WD is within the DL-L and that it matches a valid token transmitted by the primary PD and stored on the secondary PD or elsewhere on the network (steps 322, 324)—or that the token is invalid, in which case it denies the login request (step 325). If the tokens are unique to each user, the secondary PD may look up the user corresponding to the sensed valid token and automatically log that particular user in.

After a successful login, the WD constantly monitors the user's continued presence by pulse, breath, capacitance or the like (step 328) and, upon failing to sense a continued presence, deletes, disables, or otherwise invalidates its token (step 329). In some embodiments, the user may make a "de-authentication request" (step 332) of the WD (e.g., button on the WD housing) or optionally of the secondary PD (e.g., through its user interface) to cause a deletion, disablement, or other invalidation of the token on the WD.

Meanwhile, the secondary PD constantly monitors whether the WD is still within the DL-L and the token is still valid (step 330). If either answer is "no," the secondary PD logs the user out (step 331), optionally after a delay, double-check, or error query to which the user fails to respond. In some embodiments, the user may enter a logout request (step 334) and the secondary PD may log the user out in response. For example, the user may have another task at a location within the DL-L but no longer wishes to use the secondary PD. The DL-L may be determined by BLE, NFC, or other low power, range-based technology.

In some embodiments, the digital leash is monitored by the WD, in other embodiments, the digital leash is monitored by the (primary or secondary) PD. Thus, either the PD or the WD, when the threshold distance between the two has been exceeded, may initiate the process to log the user out of the PD. If the PD monitors the leash, the PD may log the user out. If the WD monitors the leash, the WD may send a communication to the PD instructing the PD to log the user out.

Figure 4:
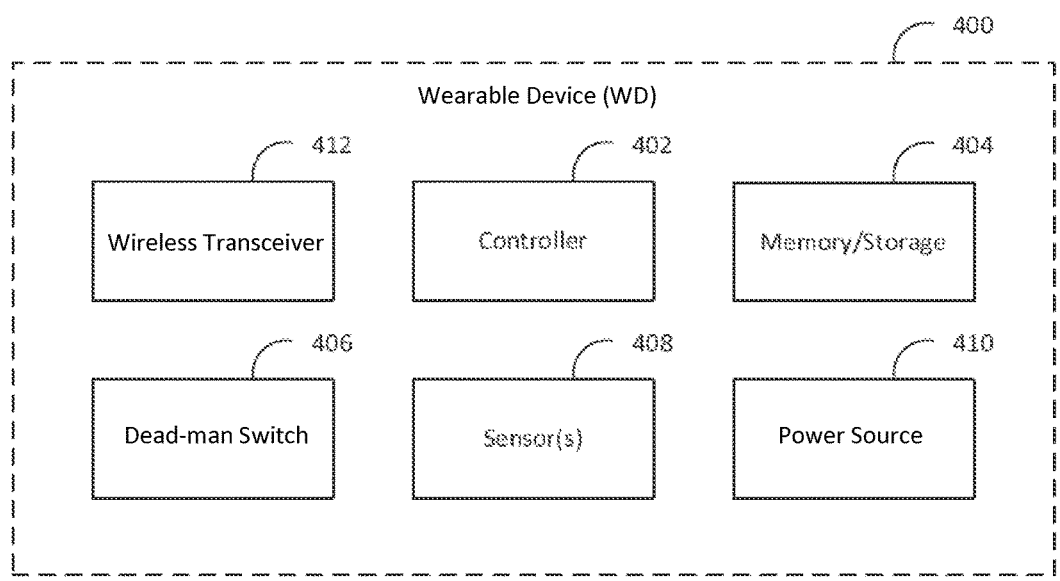
FIG. 4 illustrates example components included in an embodiment of the wearable device.

FIG. 4 is a block diagram of components included in an embodiment of the WD. In some embodiments, WD 400 may include a controller 402 (e.g., microcontroller), memory and/or storage 404 that may be a combination of volatile and nonvolatile memory and storage, a dead-man switch 406, one or more sensors 408 (e.g., accelerometer, temperature sensor, etc.), a power source 410 (e.g., a battery), and a wireless transceiver 412 (e.g., radio-frequency) to communicate with the PD(s). In some embodiments, there may be energy harvesting mechanisms to extend the life of power source 410. In some embodiments, one or more of the sensors 408 are capable of retrieving bio signatures to determine whether the user is in contact with the WD (e.g., a temperature sensor to detect body heat, a pulse detector, a capacitive touch detector, etc.).

Figure 5:
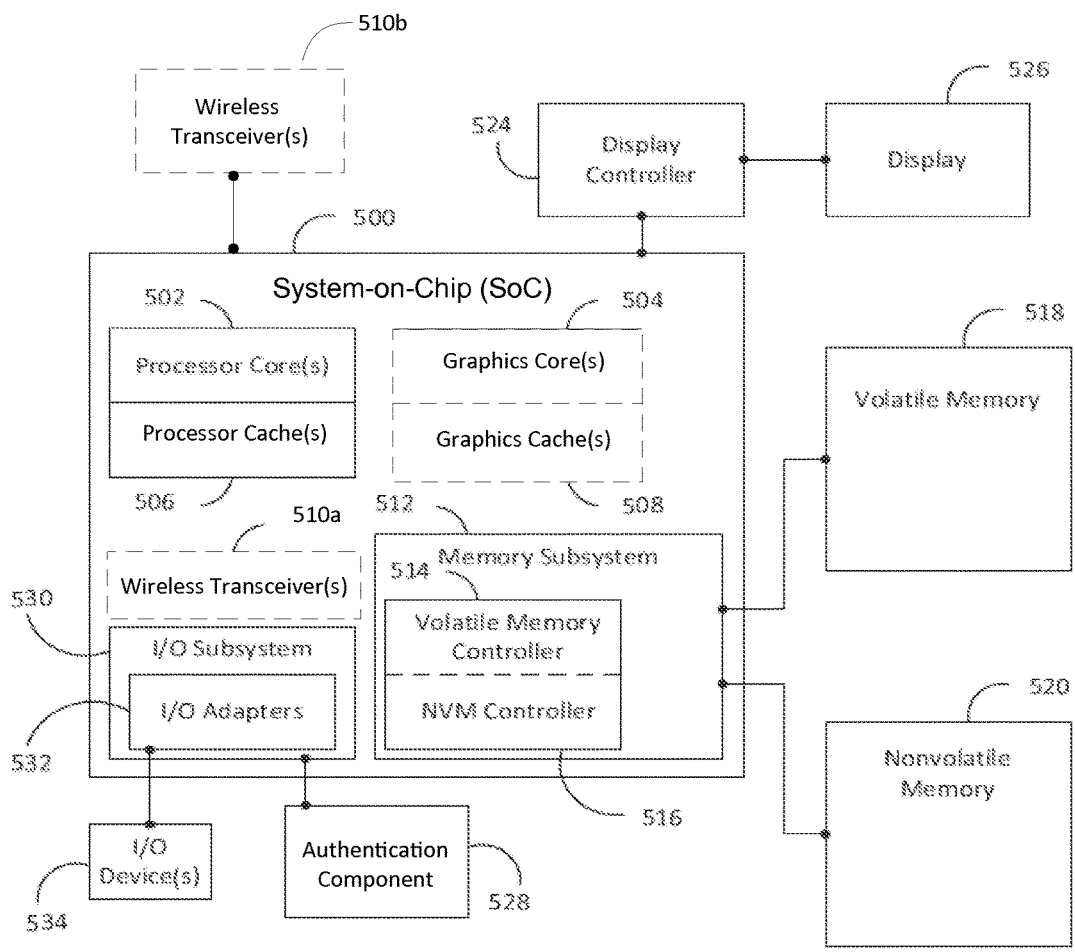
FIG. 5 illustrates an embodiment of a protected device incorporating wireless authentication technology consistent with the present disclosure.

FIG. 5 illustrates an embodiment of a PD incorporating wireless authentication technology that enables it to function as a primary PD. The PD, in some embodiments, comprises a system-on-a-chip (SoC) package 500 design, which combines processor, graphics, memory, and I/O control logic into one SoC package. Thus, in FIG. 5, processor core(s) 502, the graphics core(s) 504, their respective caches (506 and 508) are all present in the package, along with memory subsystem 512 and I/O subsystem 530.

Although not shown, each processor core may internally include one or more instruction/data caches, execution units, prefetch buffers, instruction queues, branch address calculation units, instruction decoders, floating point units, retirement units, etc. Each core present is located on a processor semiconductor die. For each logic unit shown other than the core(s) 502 in the SoC Package 500, the logic unit may be on the processor core(s) 502 semiconductor die in some embodiments or on another die in other embodiments. If a given logic unit is not on the same die as processor core(s) 502, that logic unit would be on a different semiconductor die, though in the same SoC package 500, which can include several dies communicatively coupled with each other in the package.

The SoC 500 also includes at least one lower-level processor cache 506. This may be a general-purpose cache capable of storing a significant amount of data retrieved from volatile memory 518 and/or non-volatile memory 520. In some embodiments, processor cache 506 may be shared among all cores 502. Alternatively, each core 502 may have its own dedicated processor cache 506.

Optionally, one or more graphics cores 504 are also included in SoC package 500 as well as a lower level graphics cache 508 which may store graphics-related data for the graphics core(s) 504 to work on. Graphics core(s) 504 may internally include one or more execution units and one or more instruction and data caches utilized to feed the execution units with information to process. Additionally the graphics core(s) 504 may contain other graphics logic units that are not shown in FIG. 5, such as one or more vertex processing units, rasterization units, media processing units, and codecs, among others. For simplicity, the specific logic within the graphics core(s) 504 is not shown. The graphics core and graphics cache may be involved in the authentication if images are involved in either the initial strong authentication of the user (e.g., pass-gestures or biometric scanning or imaging). Some embodiments, if not processing images during the authentication, may not need graphics capability unless it is necessary for some operation other than authentication.

The graphics core(s) 504 provide image data to the PD display. In some embodiments, the graphics core(s) 504 send data to a display controller 524, which in turn populates one or more displays 526 coupled to the system.

In FIG. 5, the SoC package 500 also includes a memory subsystem 512, including integrated volatile memory controller 514 providing access to volatile memory 518. Volatile memory controller 514 may receive a memory access request from a core and route that request to volatile memory 518. Likewise, non-volatile memory control 516 may receive a memory access request from a core and route that request to non-volatile memory 520.

In some embodiments, an input/output (I/O) subsystem 530 is present in the system in FIG. 5 to communicate with I/O devices, such as I/O device(s) 534. The I/O subsystem 530 in FIG. 5 is integrated into the SoC package 500. Within the I/O subsystem 530, one or more I/O adapter(s) 532 are present to translate commands delivered in a host communication protocol from the processor core(s) 502 into compatible protocols for particular I/O devices. Some of the protocols may include Peripheral Component Interconnect (PCI)-Express (PCI-E), 3.0; Universal Serial Bus (USB), 3.0; Serial Advanced Technology Attachment (SATA), 3.0; Small Computer System Interface (SCSI), Ultra-640; and Institute of Electrical and Electronics Engineers (IEEE) 1594 "Firewire;" among others.

Additionally, one or more of the I/O adapters may translate to one or more wireless I/O protocols to communicate with wireless peripherals such as some embodiments of the WD. Some non-limiting examples of wireless protocols include those used in personal area networks, such as IEEE 802.15 and Bluetooth, 4.0; wireless local area network (LAN) protocols such as IEEE 802.11 and its derivatives; and cellular communication protocols such as those used in cellular telephony.

At least one authentication component 528 is coupled to the SoC. The authentication component 528 may be a palm vein reader, a fingerprint reader, an iris reader, an input for a password or a pass-gesture, or one or more other components for authenticating multiple factors.

In some embodiments, one or more wireless transceivers 510a are located on, or coupled to, the SoC. In some embodiments, some or all of the wireless transceivers 510b are located outside the SoC 500. The wireless transceivers may transmit and receive cellular signals such as LTE and 3G, Bluetooth signals, NFC signals, WiFi signals, and/or one or more other wireless and/or cellular protocols.

This Description and the accompanying Drawings describe several specific embodiments to aid understanding. However, other embodiments can be practiced with modifications and alterations within the spirit and scope of the appended claims. The Description and Drawings are thus illustrative rather than limiting.

We claim:

1. A wearable device, comprising:
    a transceiver to exchange data with an external device over a wireless link, wherein the exchange of data comprises receiving a token representing a success of a multi-factor authentication, and the external device has a first digital leash-length;
    a storage component to store the token;
    an output component to present the token to at least one other external device;
    a first sensor to detect approximate contact with a body of a user wearing the wearable device; and
    a controller to control the receiving, storing, and presenting of the token, wherein the token authenticates the user to the external device;
    and further to monitor the first sensor and to delete, disable, or invalidate the token if the first sensor ceases to detect the approximate contact;
    wherein the external device is to further transmits identifying instructions for the token to one of the at least one other external device having a second digital leash-length, wherein the one of the at least one other external device comprises a second reader;
    wherein, upon receiving a login request and detecting the token within the second digital leash-length of the reader, the one of the at least one other external device automatically logs the user in and begins monitoring the token and a distance between the wearable device and the second reader.

2. The wearable device of claim 1, further comprising a second sensor to sense a distance between the wearable device and the external device and compare the distance to the first digital leash-length; wherein the controller is further to monitor the second sensor and cause the transceiver to transmit a logout request to the external device if the sensed distance exceeds the first digital leash-length.

3. The wearable device of claim 1, wherein the controller is to delete, disable, or invalidate the token in response to an opening of a dead-man switch, wherein the dead-man switch opens in response to the first sensor ceasing to detect the approximate contact.

4. The wearable device of claim 1, wherein the controller is to impose a delay between the first sensor ceasing to detect the approximate contact and the deletion, disablement, or invalidation of the token.

5. The wearable device of claim 1, further comprising a third sensor to detect a de-authentication request from the user, wherein the controller deletes, disables, or invalidates the token in response to the third sensor sensing the de-authentication request.

6. The wearable device of claim 1, wherein the controller is to delete, disable, or invalidate the token in response to at least one of:
    a threshold time interval elapsing after a strong authentication; an onset of a scheduled reset time;
    the transceiver receiving a reset signal over a network; or
    a critical depletion of a power source in the wearable device.

7. The wearable device of claim 1, further comprising a housing in the form of a watch, a pendant, a ring, an earring, or an adhesive patch.

8. The wearable device of claim 1, wherein the first sensor detects the approximate contact through a layer of clothing.

9. The wearable device of claim 1, wherein the first sensor detects the approximate contact by sensing at least one of a heartbeat, a pulse, body heat, breathing, or capacitance.

10. The wearable device of claim 1, wherein the presenting of the token comprises transmitting a wireless signal from the transceiver.

11. A system, comprising:
    a wearable device worn by a user; and
    a primary protected device equipped for multi-factor authentication and comprising a first reader capable of detecting valid tokens presented by devices within a first digital leash-length;
    wherein the wearable device monitors an approximate-contact sensor and transmits a first signal if the approximate-contact sensor detects approximate contact with a body of the user;
    wherein the multi-factor authentication comprises detecting the first signal;
    wherein, after a successful multi-factor authentication of the user, the primary protected device transmits a unique token to the wearable device;
    wherein the wearable device stores the token and presents it to external devices for authentication; and
    wherein the primary protected device thereafter grants the user access upon sensing the token, within the first digital leash-length of the first reader;
    at least one secondary protected device having a second digital leash-length;
    wherein the at least one secondary protected device comprises a second reader;
    wherein, after the successful multi-factor authentication, the primary protected device transmits identifying instructions for the token to the secondary protected device:
    wherein, upon receiving a login request and detecting the token within the second digital leash-length of the reader, the secondary protected device automatically logs the user in and begins monitoring the token and a distance between the wearable device and the second reader.

12. The system of claim 11, wherein the multi-factor authentication comprises a biometric measurement of the user.

13. The system of claim 12, wherein the biometric measurement comprises at least one of a fingerprint, a palm vein, a facial attribute, a vocal attribute, or an ocular attribute.

14. The system of claim 12, wherein the token comprises a part of a result of the biometric measurement.

15. The system of claim 11, wherein the wearable device further comprises a dead-man switch configured to open if the approximate-contact sensor ceases to detect the approximate contact with the body of the user; wherein the transceiver is to stop transmitting the first signal if the dead-man switch is open; and wherein the wearable device is configured to delete, disable, or invalidate the token, if present, when the dead-man switch opens.

16. The system of claim 11, wherein the secondary protected device logs the user out if the secondary protected device ceases detecting the token within the second digital leash-length.

17. The system of claim 11, wherein the secondary protected device is not equipped for multi-factor authentication.

* * * * *